(12) United States Patent
Black (10) Patent No.: US 9,363,425 B2
(45) Date of Patent: Jun. 7, 2016

(54) COLOR FILTER ARRANGEMENTS FOR FUSED ARRAY IMAGING SYSTEMS

(71) Applicant: Semiconductor Components Industries, LLC, Phoenix, AZ (US)

(72) Inventor: Robert A. Black, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 74 days.

(21) Appl. No.: 14/091,827

(22) Filed: Nov. 27, 2013

(65) Prior Publication Data

US 2014/0160326 A1    Jun. 12, 2014

Related U.S. Application Data

(60) Provisional application No. 61/734,337, filed on Dec. 6, 2012.

(51) Int. Cl.
*H04N 5/225* (2006.01)
*H04N 9/07* (2006.01)
*H04N 9/68* (2006.01)
*H04N 9/04* (2006.01)

(52) U.S. Cl.
CPC .............. *H04N 5/2257* (2013.01); *H04N 9/045* (2013.01)

(58) Field of Classification Search
None
See application file for complete search history.

(56) References Cited

U.S. PATENT DOCUMENTS

| 7,924,483 | B2 | 4/2011 | Smith et al. |
| 7,961,239 | B2 | 6/2011 | Lee |
| 8,478,123 | B2 | 7/2013 | Cao et al. |
| 2011/0221599 | A1 | 9/2011 | Hogasten |
| 2011/0254985 | A1* | 10/2011 | Hiramoto et al. ............. 348/294 |
| 2012/0098975 | A1* | 4/2012 | Chao et al. ..................... 348/187 |
| 2013/0016251 | A1* | 1/2013 | Ogasahara .................... 348/238 |
| 2013/0063622 | A1* | 3/2013 | Schoeberl et al. .......... 348/222.1 |
| 2014/0063300 | A1* | 3/2014 | Lin et al. ........................ 348/277 |

* cited by examiner

*Primary Examiner* — Aung S Moe
*Assistant Examiner* — Euel Cowan
(74) *Attorney, Agent, or Firm* — Treyz Law Group, P.C.; Kendall P. Woodruff (57) ABSTRACT

Electronic devices may include camera modules. A camera module may include an array camera having an array of lenses and a corresponding array of image sensors. The array of image sensors may include a monochromatic image sensor such as a green image sensor and a polychromatic image sensor such as a red and blue image sensor. The red and blue image sensor may include a color filter array of red and blue color filter elements formed over an array of image pixels. The red and blue color filter elements in the polychromatic image sensor may be arranged in a checkerboard pattern, a zigzag pattern that extends vertically from the top of the pixel array to the bottom of the pixel array, or a diagonal strip pattern. The electronic device may include processing circuitry for combining monochromatic images from the monochromatic image sensor with polychromatic images from the polychromatic image sensor.

12 Claims, 6 Drawing Sheets

COLOR FILTER ARRANGEMENTS FOR FUSED ARRAY IMAGING SYSTEMS

This application claims the benefit of provisional patent application No. 61/734,337, filed Dec. 6, 2012, which is hereby incorporated by reference herein in its entirety.

BACKGROUND

This relates generally to imaging devices, and more particularly, to imaging devices with multiple lenses and multiple image sensors.

Image sensors are commonly used in electronic devices such as cellular telephones, cameras, and computers to capture images. In a typical arrangement, an electronic device is provided with a single image sensor having a single pixel array and a single corresponding lens. Some electronic devices use an array of image sensors and a corresponding array of lenses to gather image data. This type of system, which is sometimes referred to as an array camera or a fused array camera, may be used to extend depth of focus, increase output resolution through super-resolution processing, and capture depth information from a scene.

In conventional array cameras, each image sensor in the image sensor array is typically monochromatic. For example, a conventional array camera may include a red image sensor configured to gather red light, a green image sensor configured to gather green light, and a blue image sensor configured to gather blue light. Image data from the three monochromatic image sensors is combined to form full-color images.

Conventional array cameras having three monochromatic image sensors can take up a large amount of space in an electronic device and can require large amounts of silicon to accommodate all three image sensors. The large amount of silicon needed to form an array camera having three monochromatic image sensors increases manufacturing costs. This type of arrangement also takes up valuable real estate in an electronic device.

It would therefore be desirable to be able to provide improved arrangements for fused array imaging systems.

DETAILED DESCRIPTION

Digital camera modules are widely used in electronic devices such as digital cameras, computers, cellular telephones, and other electronic devices. These electronic devices may include one or more image sensors that gather incoming light to capture an image. Each image sensor may include an array of image pixels. Each image pixel in the image sensor may include a photosensitive element such as a photodiode that converts the incoming light into digital data. Image sensors may have any number of pixels (e.g., hundreds or thousands or more). A typical image sensor may, for example, have hundreds, thousands, or millions of pixels (e.g., megapixels).

Figure 1:
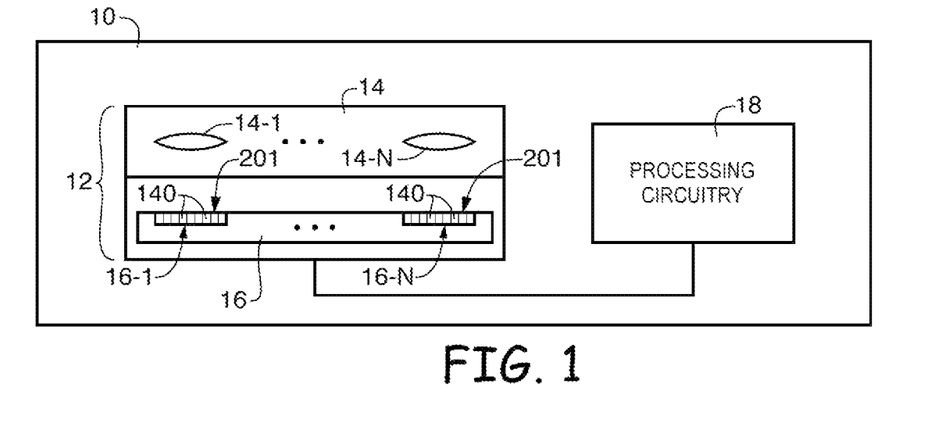
FIG. 1 is a diagram of an illustrative electronic device that contains a camera module with an array of lenses and a corresponding array of image sensors in accordance with an embodiment of the present invention.

FIG. 1 is a diagram of an illustrative electronic device that uses one or more image sensors to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include an array of lenses 14 and a corresponding array of image sensors 16. During image capture operations, light from a scene may be focused onto image sensors 16-1, . . . 16-N using respective lenses 14-1, . . . 14-N. Each image sensor may include an image pixel array such as array 201 of image pixels 140. Each image pixel 140 may include a photosensitive element such as a photodiode that converts incoming light into corresponding image data. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

There may be any suitable number of lenses in lens array 14 and any suitable number of image sensors in image sensor array 16. Lens array 14 may, as an example, include N*M individual lenses arranged in an N×M two-dimensional array. The values of N and M may be one, two, three, greater than three, greater than 10, etc. Image sensor array 16 may contain a corresponding N×M two-dimensional array of individual image sensors. The image sensors may be formed on one or more separate semiconductor substrates. With one suitable arrangement, which is sometimes described herein as an example, the image sensors are formed on a common semiconductor substrate (e.g., a common silicon image sensor integrated circuit die). The image sensors may be identical to each other or there may be different types of image sensors in a given image sensor array integrated circuit. One or more of the image sensors may be a Video Graphics Array (VGA) sensor with a resolution of 480×640 sensor pixels (as an example). Other types of sensor pixels may also be used for the image sensors if desired. For example, images sensors with greater than VGA resolution sensor (e.g., high-definition image sensors) or less than VGA resolution may be used, image sensor arrays in which the image sensors are not all identical may be used, etc.

The use of a camera module with an array of lenses and a corresponding array of image sensors (i.e., an array camera) may allow images to be captured with increased depth of field because each individual image sensor in the array may be smaller than a conventional image sensor. The reduced image sensor size allows the focal length of each lens in the lens array to be reduced relative to that of a conventional single-lens configuration. Color cross-talk may also be reduced relative to a single stand-alone image sensor, because one or more image sensors in the image sensor array may include a monochromatic color filter instead of a conventional Bayer pattern color filter array. Monochromatic image sensors may exhibit an increased signal-to-noise ratio and greater color fidelity than an image sensor having a Bayer pattern color filter array.

The color filters may be formed over image pixels 140 in each array 201. The color filters may include red filters, blue filters, green filters, clear filters, and/or filters of other colors. Other filters such as infrared-blocking filters, filters that block visible light while passing infrared light, ultraviolet-light blocking filters, white color filters, etc. may also be used. In an array with multiple image sensors, some of the image sensors may have monochromatic color filters, some may have patterned color filter arrays (e.g., patterned color filter arrays with two colors, patterned color filter arrays with three colors such as a Bayer color filter array, etc.), some may have infrared-blocking filters, some may have ultraviolet-light-blocking filters, some may be visible-light-blocking-and-infrared-passing filters, etc.

Processing circuitry 18 (e.g., processing circuitry integrated onto sensor array integrated circuit 16 and/or processing circuitry on one or more associated integrated circuits) can select which digital image data to use in constructing a final image for the user of device 10. For example, circuitry 18 may be used to blend image data from a green sensor and image data from a red and blue sensor to produce full-color images, may be used to select an infrared-passing filter sensor when it is desired to produce infrared images, may be used to produce 3-dimensional images using data from two or more different sensors that have different vantage points when capturing a scene, etc. Circuitry 18 may be configured to use edge-aware interpolation software during image processing operations. The edge-aware interpolation software may allow processing circuitry 18 to interpolate image data based on the locations of edges of objects in an image.

In some modes of operation, all of the sensors in array 16 may be active (e.g., when capturing high-quality images). In other modes of operation (e.g., a low-power preview mode), only a subset of the image sensors may be used. Other sensors may be inactivated to conserve power (e.g., their positive power supply voltage terminals may be taken to a ground voltage or other suitable power-down voltage and their control circuits may be inactivated or bypassed).

If desired, image pixels 140 of image sensors 16 may have a diamond shape in which the edges of image pixels 140 are not parallel to the edges of camera module 12 (e.g., the edges of pixels 140 may be formed at an angle other than 180 degrees or 90 degrees with respect to the edges of camera module 12). In other words, pixel arrays 201 in image sensors 16 may each be rotated by 45 degrees relative to a conventional square grid pixel array. Image pixels 140 having this type of non-rectilinear (e.g., non-square) shape are sometimes referred to as asymmetrical image pixels or polygonal image pixels.

Figure 2:
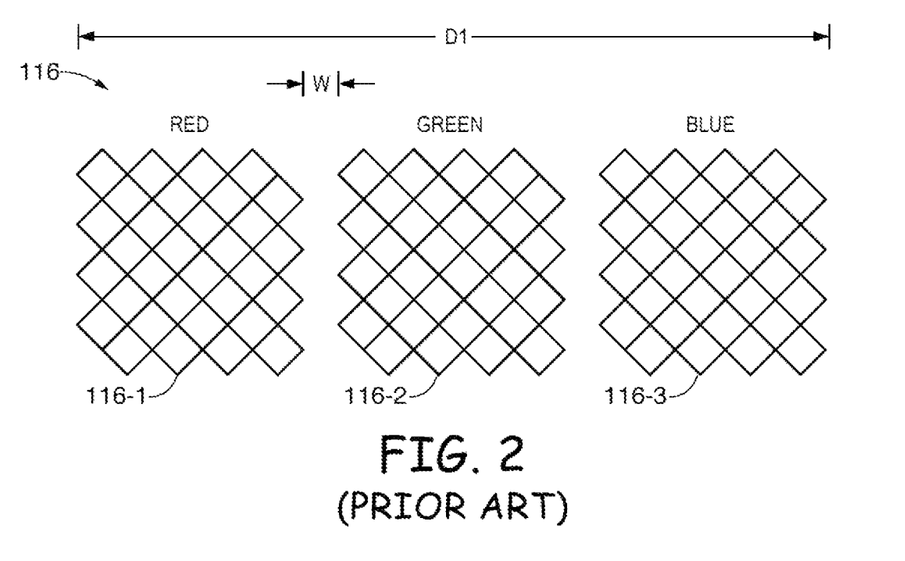
FIG. 2 is a top view of a conventional fused array imaging device having three monochromatic image sensors.

FIG. 2 is a top view of a conventional fused array imaging system. As shown in FIG. 2, a conventional fused array imaging system includes an image sensor array 116 having three monochromatic image sensors, 116-1, 116-2, and 116-3. Each monochromatic image sensor in image sensor array 116 is configured to gather light of a single color. In a typical arrangement, image sensor 116-1 is a red image sensor having a red color filter and is configured to gather red light only; image sensor 116-2 is a green image sensor having a green color filter and is configured to gather green light only; and image sensor 116-3 is a blue image sensor having a blue color and is configured to gather blue light only. Image data from all three image sensors in array 116 is combined to form full-color images.

The length D1 required on an image sensor substrate to accommodate all three monochromatic image sensors of array 116 can be undesirably large. A minimum width W is typically maintained between adjacent image sensors in order to accommodate image sensor circuitry, which in turn increases the minimum distance D1 needed on the image sensor substrate for array 116. This arrangement can take up valuable real estate in an electronic device, and the amount of silicon needed can increase manufacturing costs.

Figure 3:
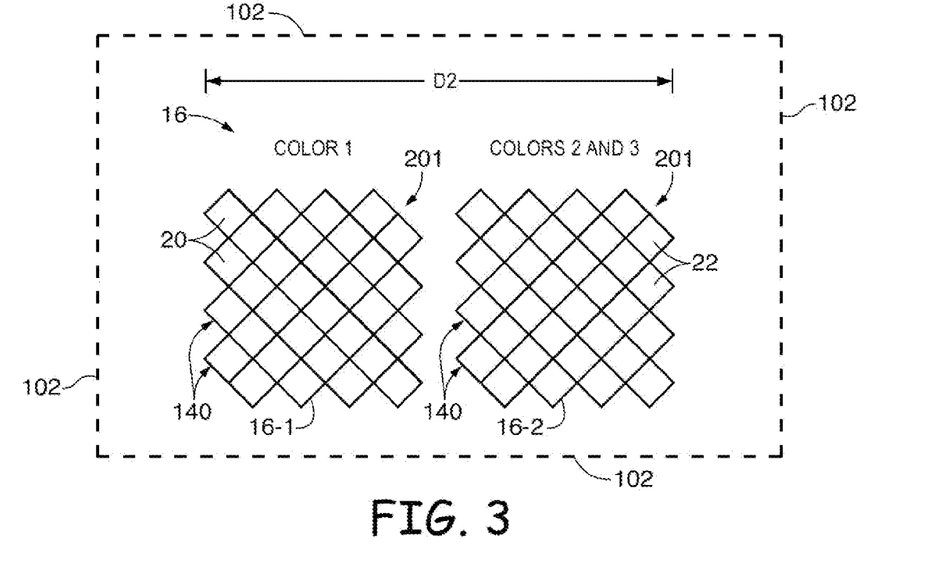
FIG. 3 is a top view of a fused array imaging device having a monochromatic image sensor and a polychromatic image sensor in accordance with an embodiment of the present invention.

FIG. 3 is a top view of an illustrative fused array imaging system that includes one or more monochromatic image sensors and one or more polychromatic image sensors. As shown in FIG. 3, a first image sensor in array 16 such as image sensor 16-1 may be monochromatic (e.g., corresponding to color 1), whereas a second image sensor in array 16 may be polychromatic (e.g., a bicolor image sensor having a bicolor color filter array corresponding to colors 2 and 3). For example, image sensor 16-1 may be a green image sensor having a green color filter and configured to gather green light, whereas image sensor 16-2 may be a red and blue image sensor having a red and blue color filter array and configured to gather red and blue light.

The distance D2 required on an image sensor substrate to accommodate this type of image sensor array may be less than the distance D1 required for a conventional image sensor array of the type shown in FIG. 1. This in turn reduces the amount of silicon needed to form image sensor array 16, leading to reduced manufacturing costs while maximizing the amount of space available for other components in the electronic device.

Monochromatic image sensor 16-1 and polychromatic image sensor 16-2 may each include a color filter array having a plurality of color filter elements such as color filter elements 20 and color filter elements 22. For example, color filter elements 20 of monochromatic image sensor 16-1 may be green color filters elements, blue color filter elements, green color filter elements, or clear color filter elements. Color filters 22 of polychromatic image sensor 16-2 may be red and blue color filter elements, green and blue color filter elements, clear and blue color filter elements, red and green color filter elements, red and clear color filter elements, or clear and green color filter elements. Arrangements in which color filter elements 20 of monochromatic image sensor 16-1 are green color filter elements and color filter elements 22 of polychromatic image sensor 16-2 are red and blue color filter elements are sometimes described herein as an example. This is, however, merely illustrative. If desired, color filter elements 20 of monochromatic image sensor 16-1 may be clear color filter elements and color filter elements 22 of polychromatic image sensor 16-2 may be red and blue color filter elements.

As shown in FIG. 3, image pixels 140 of image sensors 16-1 and 16-2 may have a diamond shape in which the edges of image pixels 140 are not parallel to edges 102 of the camera module (e.g., the edges of pixels 140 may be formed at an angle other than 180 degrees or 90 degrees with respect to edges 102 of the camera module). In other words, pixel arrays 201 in image sensors 16-1 and 16-2 may each be rotated by 45 degrees relative to a conventional square grid pixel array. Image pixels 140 of the type shown in FIG. 3 are sometimes referred to as asymmetrical image pixels or polygonal image pixels.

Figure 4:
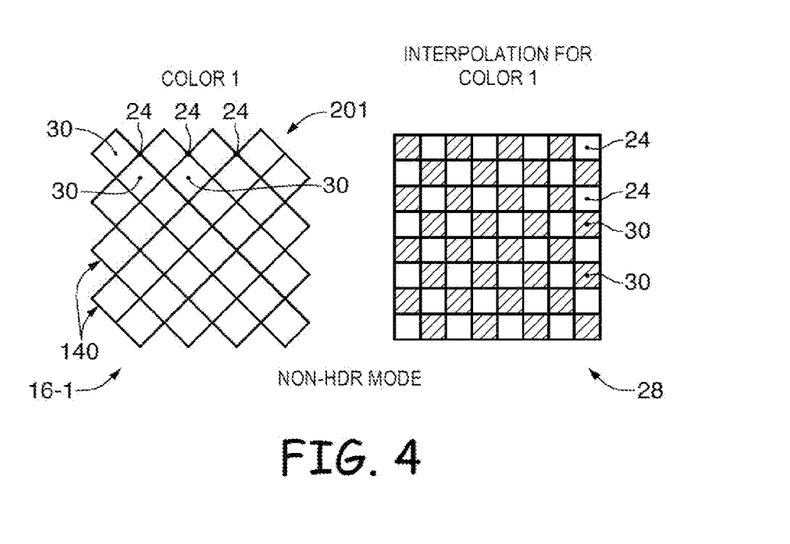
FIG. 4 is a diagram showing how image data is interpolated in non-HDR mode in an illustrative monochromatic image sensor in a fused array imaging system in accordance with an embodiment of the present invention.
Figure 5:
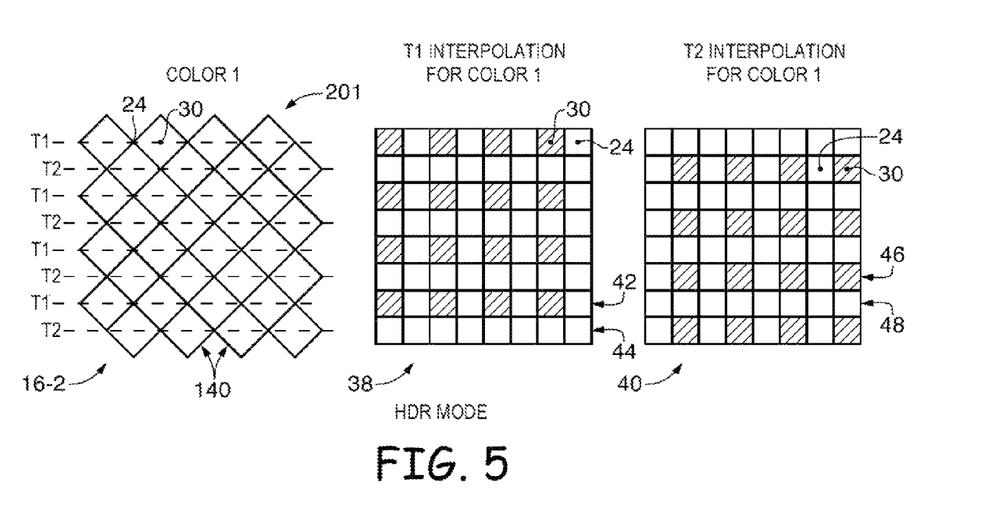
FIG. 5 is a diagram showing how image data is interpolated in HDR mode in an illustrative monochromatic image sensor in a fused array imaging system in accordance with an embodiment of the present invention.

During image processing operations, image data from asymmetric pixels or diamond-shaped pixels may be converted into square pixel data (e.g., corresponding to an rectangular grid of square pixels). FIGS. 4 and 5 are diagrams showing how image data from diamond-shaped pixels 140 in monochromatic image sensor 16-1 may be converted into square pixel data.

FIG. 4 illustrates how data is interpolated for a monochromatic image sensor such as monochromatic image sensor 16-1 of FIG. 3 having diamond-shaped pixels and operating in non-high-dynamic-range (non-HDR) mode (e.g., where each imaging frame is captured with a single exposure). During image processing operations, processing circuitry 18 may convert diamond-shaped pixel data from image sensor 16-1 into square pixel data such as square pixel data 28.

As shown in FIG. 4, some pixel data in square pixel data 28 may be missing and may need to be interpolated based on nearby pixel data. The shaded portions of pixel data 28 correspond to locations for which actual pixel data has been gathered by image pixels 140, whereas the non-shaded portions of pixel data 28 correspond to locations for which pixel data is interpolated. In an image sensor having a rotated pixel array of the type shown in FIG. 4, pixel data at locations corresponding to the "points" of each diamond-shaped pixel 140 (e.g., at locations 24) may be interpolated, whereas pixel data at locations corresponding to the center of each diamond-shaped pixel 140 (e.g., at locations 30) may be actual data gathered by pixel array 201.

Processing circuitry 18 may interpolate pixel values for each non-shaded portion of pixel data 28. In configurations where monochromatic image sensor is a green image sensor, processing circuitry 18 may interpolate green pixel values for each non-shaded portion of pixel data 28 based on nearby green pixel values. For example, green pixel values at locations 24 may be interpolated based on green pixel values at nearby locations 30. With this type of arrangement, the maximum interpolation distance (e.g., the maximum distance between an interpolated pixel data point and an actual pixel data point) is 1 times the pixel pitch.

FIG. 5 illustrates how data is interpolated for a monochromatic image sensor such as monochromatic image sensor 16-1 of FIG. 3 having diamond-shaped pixels and operating in high-dynamic-range (HDR) mode (e.g., where each imaging frame is captured with multiple exposures).

The dynamic range of an image may be defined as the luminance ratio of the brightest element in a given scene to the darkest element in the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using an interleaved integration (or interleaved exposure (IE)) process. In an interleaved exposure process, interleaved images may be captured by an image sensor. The interleaved images may have rows of long-exposure image pixel values that are interleaved (or interlaced or interspersed) with rows of short-exposure image pixel values.

As shown in FIG. 5, pixel array 201 may include some rows of pixels that are exposed for a long-exposure time T1 and some rows of pixel that are exposed for a short-exposure time T2. In the example of FIG. 5, the exposure time alternates every other row of pixels. Processing circuitry 18 may separate interleaved pixel data from pixel array 201 into long-exposure pixel data 38 and short-exposure pixel data 40. Long-exposure pixel data 38 may include rows 42 of pixel data that was gathered during long-exposure time T1 and rows 44 of missing pixel values (e.g., corresponding to rows for which short-exposure time T2 was used). Short-exposure pixel data 40 may include rows 46 of pixel data that was gathered during short-exposure time T2 and rows 48 of missing pixel values (e.g., corresponding to rows for which long-exposure time T1 was used).

Both long-exposure pixel data 38 and short-exposure pixel data 40 include empty pixel values for locations 24 corresponding to the "points" of diamond-shaped pixels. Processing circuitry 18 may interpolate pixel data values for locations 24 based on nearby pixel data at locations 30 (e.g., locations corresponding to the center of diamond-shaped pixels 140).

Processing circuitry 18 may also interpolate (deinterlace) long-exposure image data 38 and short-exposure image data 40 by interpolating values for rows 44 of pixel data 38 and by interpolating values for rows 48 of pixel data 40. Pixel data in rows 44 of pixel data 38 may be interpolated based on nearby pixel values at locations 30 in rows 42, whereas pixel data in rows 48 of pixel data 40 may be interpolated based on nearby pixel values at locations 30 in rows 46.

After interpolating values for all non-shaded portions of pixel data 38, and after interpolating values for all non-shaded portions of pixel data 40, processing circuitry 18 may combine interpolated pixel data 38 and 40 to form a monochromatic, high-dynamic range image. In the illustrative example of FIG. 5, the maximum interpolation distance is $\sqrt{2}$ times the pixel pitch.

Figure 6:
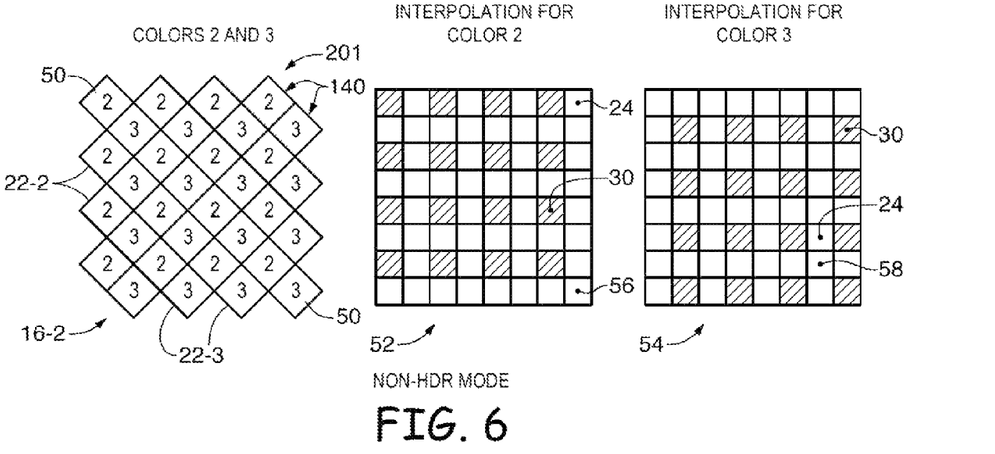
FIG. 6 is a diagram showing how image data is interpolated in non-HDR mode in an illustrative polychromatic image sensor having a checkerboard color filter pattern in a fused array imaging system in accordance with an embodiment of the present invention.
Figure 7:
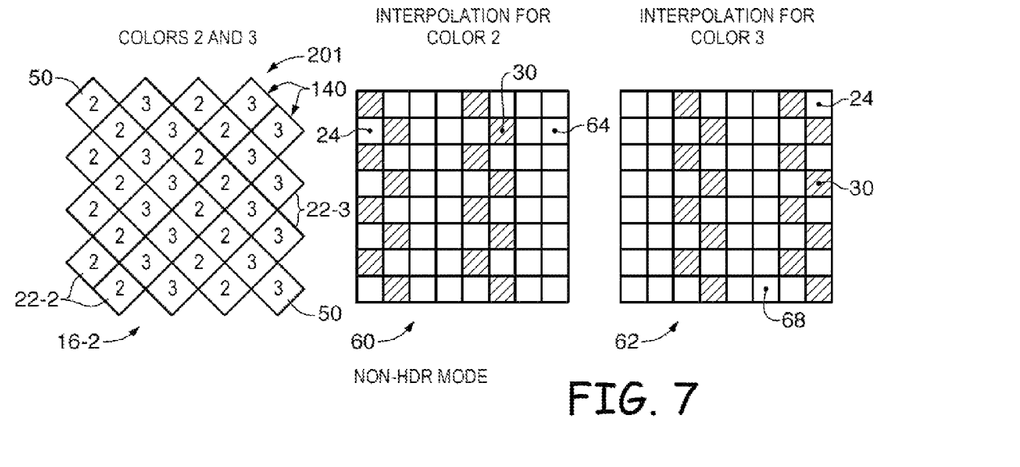
FIG. 7 is a diagram showing how image data is interpolated in non-HDR mode in an illustrative polychromatic image sensor having a zigzag color filter pattern in a fused array imaging system in accordance with an embodiment of the present invention.
Figure 8:
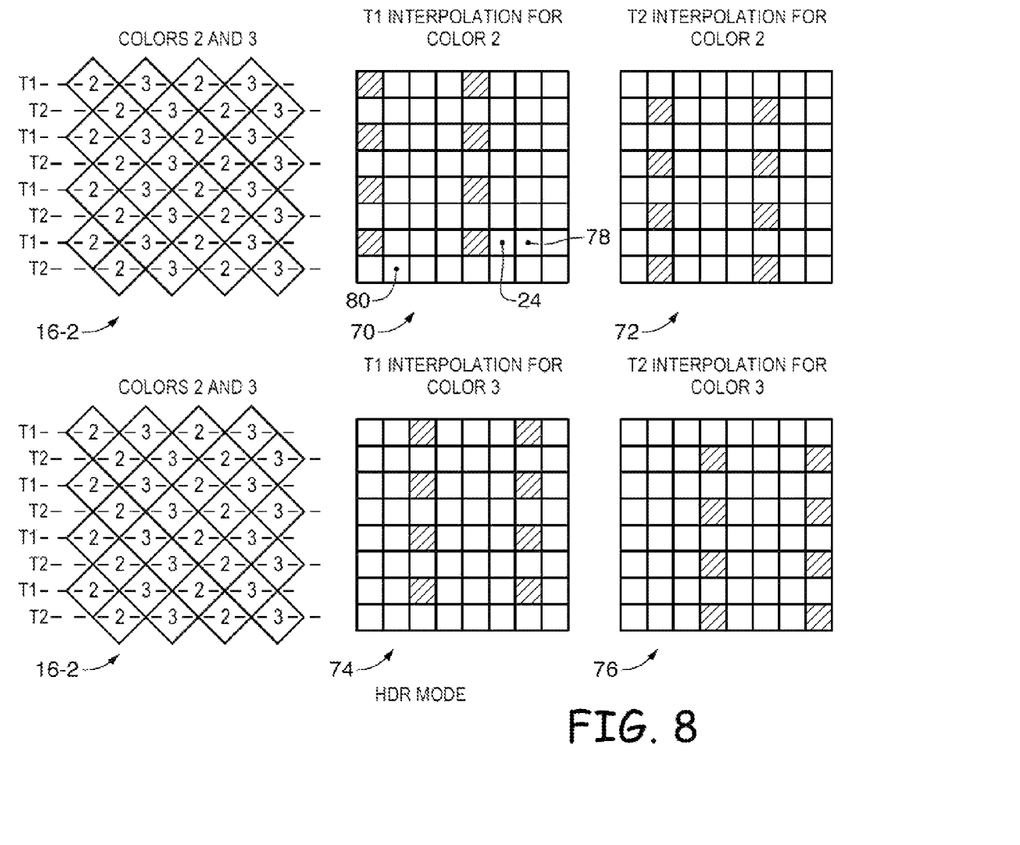
FIG. 8 is a diagram showing how image data is interpolated in HDR mode in an illustrative polychromatic image sensor having a zigzag color filter pattern in a fused array imaging system in accordance with an embodiment of the present invention.
Figure 9:
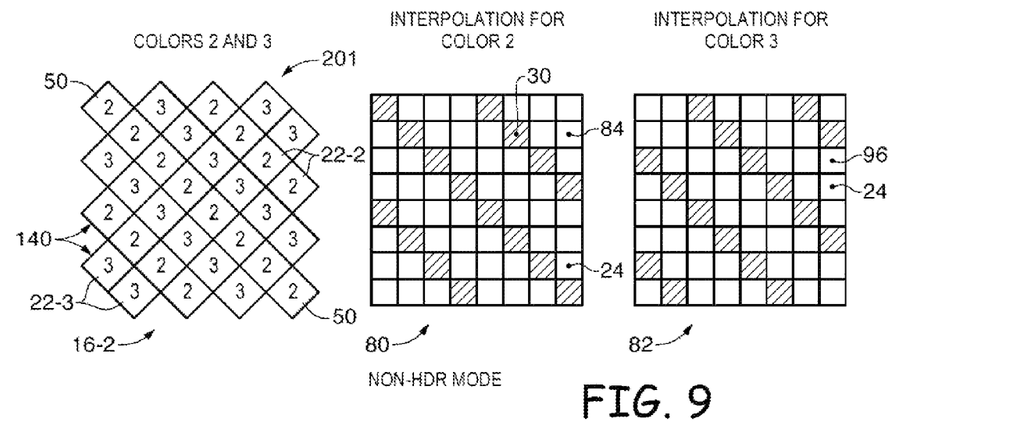
FIG. 9 is a diagram showing how image data is interpolated in non-HDR mode in an illustrative polychromatic image sensor having a diagonal-stripe color filter pattern in a fused array imaging system in accordance with an embodiment of the present invention.
Figure 10:
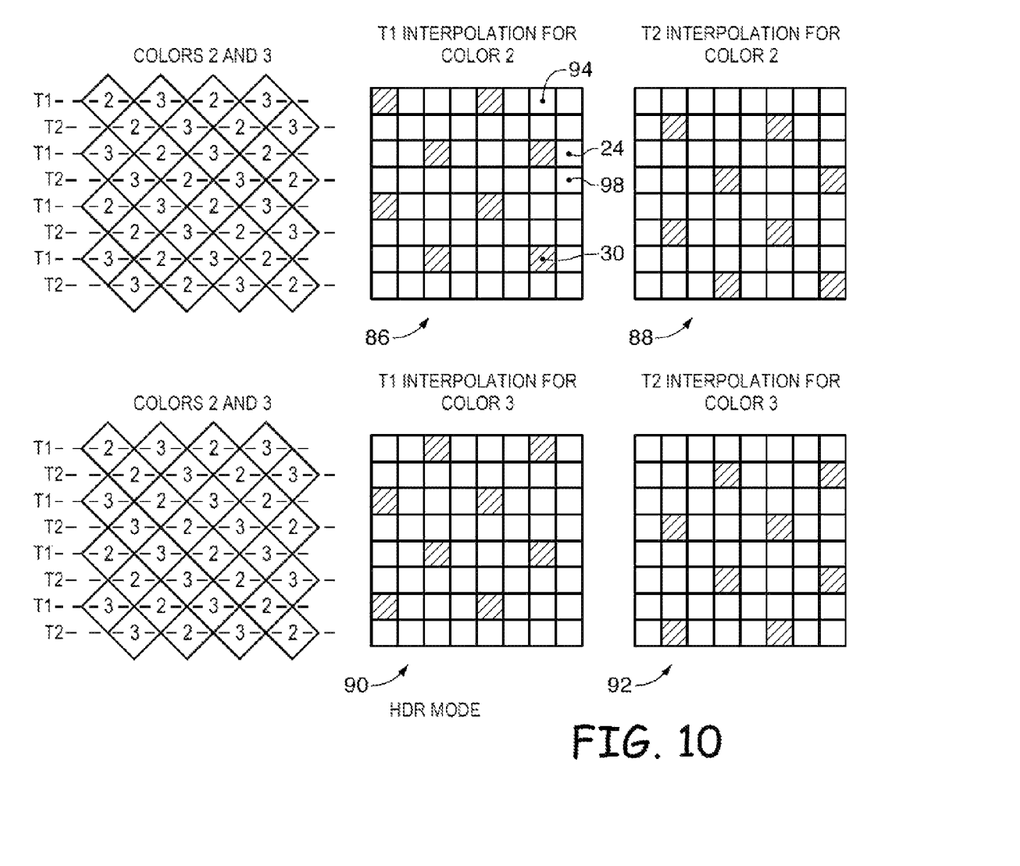
FIG. 10 is a diagram showing how image data is interpolated in HDR mode in an illustrative polychromatic image sensor having a diagonal-stripe color filter pattern in a fused array imaging system in accordance with an embodiment of the present invention.

For a polychromatic image sensor such as polychromatic image sensor 16-2 of FIG. 3, the maximum interpolation distance during image processing operations depends on the particular type of color filter pattern used (e.g., how the different colors in the color filter array are arranged with respect to each other). FIG. 6 illustrates how data is interpolated for a polychromatic image sensor having a checkerboard-type pattern of color filters. FIGS. 7 and 8 illustrate how data is interpolated for a polychromatic image sensor having a zigzag pattern of color filters. FIGS. 9 and 10 illustrate how data is interpolated for a polychromatic image sensor having a diagonal-stripe pattern of color filters.

As shown in FIG. 6, image sensor 16-2 may include diamond-shaped pixels 140 (e.g., an array of pixels 140 that has been rotated by 45 degrees relative to a conventional square grid pixel array). Image sensor 16-2 may include an array of color filters such as color filters 22-2 and 22-3. Color filters 22-2 may be configured to pass light corresponding to a first color (e.g., color 2) while blocking light of other colors. Color filters 22-3 may be configured to pass light corresponding to a second color (e.g., color 3) while blocking light of other colors. In one example, color 2 may be red and color 3 may be blue. This is, however, merely illustrative. In general, color 2 may be any suitable color and color 3 may be any suitable color. For example, color 2 may be blue and color 3 may be red. Arrangements in which color 2 is red and color 3 is blue are sometimes described herein as an example.

In the example of FIG. 6, color filters 22-2 and 22-3 are arranged in a diagonal checkerboard pattern. With this type of arrangement, every diagonal line of pixels 140 in image sensor 16-2 includes a series of color filter elements that alternate color with every pixel. For example, diagonal line 50 in pixel array 201 includes both red and blue color filters, alternating between red and blue with every pixel 140 in line 50. Each red color filter 22-2 is surrounded on each of its four sides by blue color filters 22-3. Similarly, each blue color filter 22-3 is surrounded on each of its four sides by red color filters 22-2.

When image sensor 16-2 is operated in non-HDR mode, processing circuitry 18 may separate pixel data from rotated pixel array 201 into square grid pixel data 52 for color 2 and square grid pixel data 54 for color 3. As shown in FIG. 6, some pixel data (e.g., the non-shaded portions) in square pixel data 52 and 54 may be missing and may need to be interpolated based on nearby pixel data. For example, red square pixel data 52 may have missing pixel values at locations 24 (corresponding to the points of each diamond-shaped pixel 140) and at locations 56 (corresponding to pixel data that was gathered using blue pixels in array 201). Blue square pixel data 54 may have missing pixel values at locations 24 (corresponding to the points of each diamond-shaped pixel 140) and at locations 58 (corresponding to pixel data that was gathered using red pixels in array 201).

Using actual red pixel values (e.g., at locations 30), processing circuitry 18 may interpolate red pixel data values for all locations for which red pixel data is missing (e.g., for the non-shaded portions of pixel data 52). Similarly, processing circuitry 18 may use actual blue pixel values (e.g., at locations 30) to interpolate blue pixel data values for all locations for which blue pixel data is missing (e.g., for the non-shaded portions of pixel data 54).

After interpolating red pixel values for red pixel data 52, and after interpolating blue pixel values blue pixel data 54, processing circuitry 18 will have formed a complete red image and a complete blue image. Processing circuitry 18 may then combine the red and blue images with the green image from image sensor 16-1 (FIG. 4) to form a full-color image. With the illustrative color filter pattern of FIG. 6, the maximum interpolation distance for non-HDR mode is times the pixel pitch.

In the illustrative example of FIGS. 7 and 8, color filters 22-2 and 22-3 are each grouped in zigzag lines that extend vertically from the upper edge of pixel array 201 to the lower edge of pixel array 201. For example, vertically extending groups of red pixels in a zigzag or serpentine pattern may be interleaved with vertically extending groups of blue pixels in a zigzag or serpentine pattern. With this type arrangement, every diagonal line of pixels 140 in image sensor 16-2 includes a series of color filter elements that alternate color every two pixels. For example, diagonal line 50 in pixel array 201 includes both red and blue color filters, alternating between red and blue every two pixels. Each red color filter 22-2 is surrounded on its four sides by two red color filters 22-2 and two blue color filters 22-3. Similarly, each blue color filter 22-3 is surrounded on its four sides by two blue color filters 22-3 and two red color filters 22-2.

FIG. 7 illustrates how data is interpolated for a polychromatic image sensor having this type of zigzag color filter pattern and operating in non-HDR mode. When image sensor 16-2 is operated in non-HDR mode, processing circuitry 18 may separate pixel data from rotated pixel array 201 into square grid pixel data 60 for color 2 and square grid pixel data 62 for color 3.

As shown in FIG. 7, some pixel data (e.g., the non-shaded portions of FIG. 7) in square pixel data 60 and 62 may be missing and may need to be interpolated based on nearby pixel data. For example, red square pixel data 60 may have missing pixel values at locations 24 (corresponding to the points of each diamond-shaped pixel 140) and at locations 64 (corresponding to pixel data that was gathered using blue pixels in array 201). Blue square pixel data 62 may have missing pixel values at locations 24 (corresponding to the points of each diamond-shaped pixel 140) and at locations 68 (corresponding to pixel data that was gathered using red pixels in array 201).

Using actual red pixel values (e.g., at locations 30), processing circuitry 18 may interpolate red pixel data values for all locations for which red pixel data is missing (e.g., for the non-shaded portions of pixel data 60). Similarly, processing circuitry 18 may use actual blue pixel values (e.g., at locations 30) to interpolate blue pixel data values for all locations for which blue pixel data is missing (e.g., for the non-shaded portions of pixel data 62).

After interpolating red pixel values for red pixel data 60, and after interpolating blue pixel values for blue pixel data 62, processing circuitry 18 will have formed a complete red image and a complete blue image. Processing circuitry 18 may then combine the red and blue images with the green image from image sensor 16-1 (FIG. 4) to form a full-color image. With the illustrative color filter pattern of FIG. 7, the maximum interpolation distance for non-HDR mode is $\sqrt{2}$ times the pixel pitch.

FIG. 8 illustrates how data is interpolated for a polychromatic image sensor having the same type of zigzag color filter pattern of FIG. 7 but operating in HDR mode. When image sensor 16-2 is operated in HDR mode, processing circuitry 18 may separate interleaved pixel data from rotated pixel array 201 into long-exposure red square pixel data 70, short-exposure red square pixel data 72, long-exposure blue square pixel data 74, and short-exposure blue square pixel data 76.

As shown in FIG. 8, all four sets of pixel data include missing pixel data (e.g., corresponding to the non-shaded portions of FIG. 8) that may need to be interpolated based on nearby pixel data. For example, long-exposure red pixel data 70 includes missing pixel data at locations 24 (corresponding to the points of each diamond-shaped pixel 140), locations 78 (corresponding to pixel data that was gathered using blue pixels in array 201), and locations 80 (corresponding to pixel data that was gathered by red pixels in array 201 during short-exposure time T2).

Using actual red pixel values (e.g., at locations 30), processing circuitry 18 may interpolate red pixel values for all locations for which red pixel data is missing in long-exposure red pixel data 70 and short-exposure red pixel data 72. Similarly, processing circuitry 18 may interpolate blue pixel values for all locations for which blue pixel data is missing in long-exposure blue pixel data 74 and short-exposure blue pixel data 76.

After interpolating red pixel values for red pixel data 70 and 72, and after interpolating blue pixel values for blue pixel data 74 and 76, processing circuitry 18 will have formed a complete long-exposure red image, a complete short-exposure red image, a complete long-exposure blue image, and a complete short-exposure blue image. Processing circuitry 18 may then combine the short-exposure red image with the long-exposure red image to form a high-dynamic-range red image. Similarly, processing circuitry 18 may combine the short-exposure blue image with the long-exposure blue image to form a high-dynamic-range blue image. Processing circuitry 18 may combine the HDR red image and the HDR blue image with the HDR green image from image sensor 16-1 (FIG. 5) to form a full-color HDR image. With the illustrative color filter pattern of FIG. 8, the maximum interpolation distance for HDR mode is $\sqrt{5}$ times the pixel pitch.

In the illustrative example of FIGS. 9 and 10, color filters 22-2 and 22-3 are grouped in stripes that extend diagonally from the upper left side of pixel array 201 to the lower right side of pixel array 201. The diagonal stripes of red pixels may be interleaved with the diagonal stripes of blue pixels. In the illustrative example of FIG. 9, each diagonal stripe of one color is directly interposed between diagonal stripes of another color. With this type arrangement, every diagonal line of pixels 140 in image sensor 16-2 includes a series of color filter elements of a single color. For example, diagonal line 50 in pixel array 201 includes only red pixels. Each red color filter 22-2 is surrounded on its four sides by two red color filters 22-2 and two blue color filters 22-3. Similarly, each blue color filter 22-3 is surrounded on its four sides by two blue color filters 22-3 and two red color filters 22-2.

The color pattern of FIGS. 9 and 10 in which the diagonal stripes of red and blue color filters extend from the upper left side of pixel array 201 to the lower right side of pixel array 201 is merely illustrative. If desired, a reflected version of this arrangement may be used in which diagonal stripes of red and blue color filters extend from the upper right side of pixel array 201 to the lower left side of pixel array 201.

FIG. 9 illustrates how data is interpolated for a polychromatic image sensor having this type of diagonal stripe color filter pattern and operating in non-HDR mode. When image sensor 16-2 is operated in non-HDR mode, processing circuitry 18 may separate pixel data from rotated pixel array 201 into square grid pixel data 80 for color 2 and square grid pixel data 82 for color 3.

As shown in FIG. 9, some pixel data (e.g., the non-shaded portions of FIG. 9) in square pixel data 80 and 82 may be missing and may need to be interpolated based on nearby pixel data. For example, red square pixel data 80 may have missing pixel values at locations 24 (corresponding to the points of each diamond-shaped pixel 140) and at locations 84 (corresponding to pixel data that was gathered using blue pixels in array 201). Blue square pixel data 82 may have missing pixel values at locations 24 (corresponding to the points of each diamond-shaped pixel 140) and at locations 96 (corresponding to pixel data that was gathered using red pixels in array 201).

Using actual red pixel values (e.g., at locations 30), processing circuitry 18 may interpolate red pixel data values for all locations for which red pixel data is missing (e.g., for the non-shaded portions of pixel data 80). Similarly, processing circuitry 18 may use actual blue pixel values (e.g., at locations 30) to interpolate blue pixel data values for all locations for which blue pixel data is missing (e.g., for the non-shaded portions of pixel data 82).

After interpolating red pixel values for red pixel data 80, and after interpolating blue pixel values for blue pixel data 82, processing circuitry 18 will have formed a complete red image and a complete blue image. Processing circuitry 18 may then combine the red and blue images with the green image from image sensor 16-1 (FIG. 4) to form a full-color image. With the illustrative color filter pattern of FIG. 9, the maximum interpolation distance for non-HDR mode is $\sqrt{2}$ times the pixel pitch.

FIG. 10 illustrates how data is interpolated for a polychromatic image sensor having the same type of diagonal stripe color filter pattern of FIG. 9 but operating in HDR mode. When image sensor 16-2 is operated in HDR mode, processing circuitry 18 may separate interleaved pixel data from rotated pixel array 201 into long-exposure red square pixel data 86, short-exposure red square pixel data 88, long-exposure blue square pixel data 90, and short-exposure blue square pixel data 92.

As shown in FIG. 10, all four sets of pixel data include missing pixel data (corresponding to the non-shaded portions of FIG. 10) that may need to be interpolated based on nearby pixel data. For example, long-exposure red pixel data 86 includes missing pixel data at locations 24 (corresponding to the points of each diamond-shaped pixel 140), locations 94 (corresponding to pixel data that was gathered using blue pixels in array 201), and locations 98 (corresponding to pixel data that was gathered by red pixels in array 201 during short-exposure time T2).

Using actual red pixel values (e.g., at locations 30), processing circuitry 18 may interpolate red pixel values for all locations for which red pixel data is missing in long-exposure red pixel data 86 and short-exposure red pixel data 88. Similarly, processing circuitry 18 may interpolate blue pixel values for all locations for which blue pixel data is missing in long-exposure blue pixel data 90 and short-exposure blue pixel data 92.

After interpolating red pixel values for red pixel data 86 and 88, and after interpolating blue pixel values for blue pixel data 90 and 92, processing circuitry 18 will have formed a complete long-exposure red image, a complete short-exposure red image, a complete long-exposure blue image, and a complete short-exposure blue image. Processing circuitry 18 may then combine the short-exposure red image with the long-exposure red image to form a high-dynamic-range red image. Similarly, processing circuitry 18 may combine the short-exposure blue image with the long-exposure blue image to form a high-dynamic-range blue image. Processing circuitry 18 may then combine the HDR red image and the HDR blue image with the HDR green image from image sensor 16-1 (FIG. 5) to form a full-color HDR image. With the illustrative color filter pattern of FIG. 10, the maximum interpolation distance for HDR mode is 2 times the pixel pitch.

Figure 11:
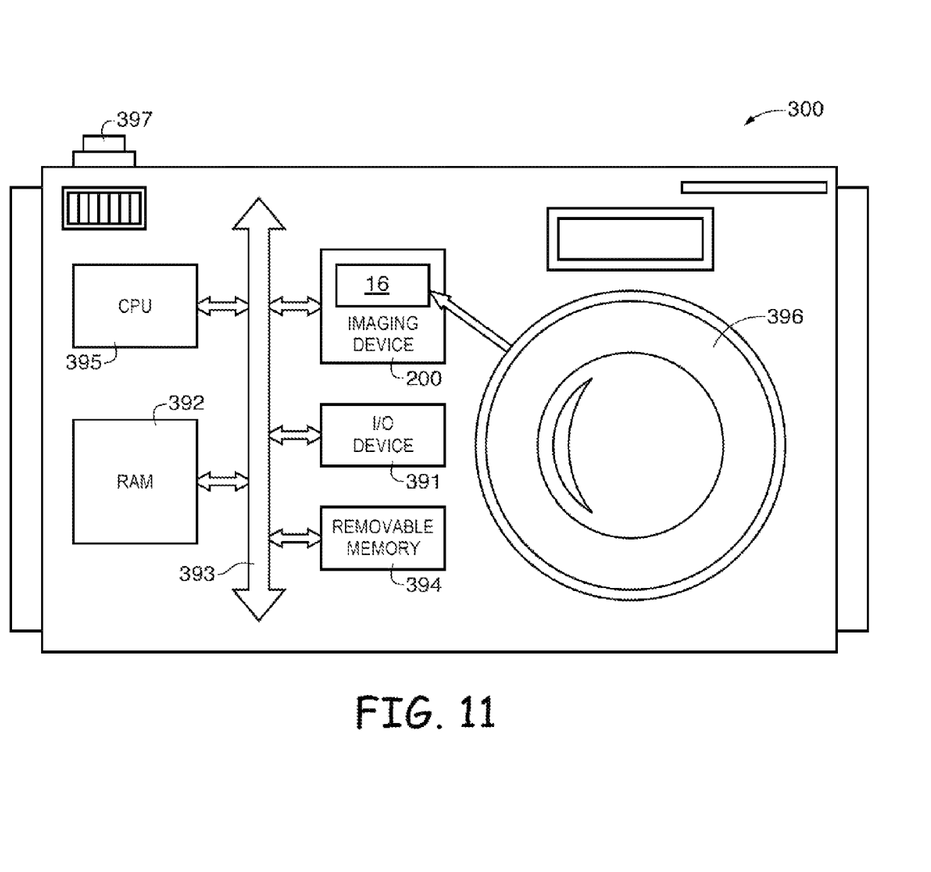
FIG. 11 is a block diagram of a processor system employing the embodiments of FIGS. 1 and 3-10 in accordance with an embodiment of the present invention.

FIG. 11 shows in simplified form a typical processor system 300, such as a digital camera, which includes an imaging device 200. Imaging device 200 may include an image sensor array (e.g., an image sensor array such as image sensor array 16 of FIG. 3 having a monochromatic image sensor and a polychromatic image sensor). Processor system 300 is exemplary of a system having digital circuits that may include imaging device 200. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating color filter arrangements for an array camera in an imaging device. The array camera may include an array of image sensors and a corresponding array of lenses. The array of image sensors may include a monochromatic image sensor and a polychromatic image sensor. The monochromatic image sensor may be a green image sensor having a green color filter formed over an array of image pixels. In another suitable embodiment, the monochromatic image sensor may be a clear image sensor having a clear color filter formed over an array of image pixels. The polychromatic image sensor may be a red and blue image sensor having a color filter array of red and blue color filter elements formed over an array of image pixels.

The arrays of image pixels in each image sensor may be rotated by 45 degrees relative to a conventional square grid pixel array and may have image pixels that are diamond-shaped (e.g., asymmetrical).

Red and blue color filter elements in a polychromatic image sensor may be arranged in any suitable pattern. In one embodiment, the red and blue color filter elements may be arranged in a checkerboard pattern where each diagonal line of pixels includes red and blue color filter elements that alternate with every pixel. In another suitable embodiment, the red and blue color filter elements may be arranged in groups of red color filter elements and groups of blue color filter elements. Each group of red color filter elements and each group of blue color filter elements may form a zigzag pattern that extends vertically from the upper edge of the pixel array to the lower edge of the pixel array. The groups of red and blue color filter elements may be interleaved with each other. In another suitable embodiment, the red and blue color filter elements may be arranged in diagonal stripes that extend diagonally from one edge of the pixel array to another edge of the pixel array. For example, the color filter array may include diagonal stripes of red color filter elements interleaved with diagonal stripes of blue color filter elements.

The array of image sensors may be operated in non-HDR mode (sometimes referred to as linear mode) or may be operated in HDR mode. In non-HDR mode, processing circuitry in the imaging device may combine non-HDR green images from the green image sensor with non-HDR red and blue images from the red and blue image sensor to form full-color non-HDR images. In HDR mode, processing circuitry in the imaging device may combine HDR green images from the green image sensor with HDR red and blue images from the red and blue image sensor to form full-color HDR images.

The foregoing is merely illustrative of the principles of this invention which can be practiced in other embodiments.

What is claimed is:

1. An imaging device, comprising:
   a monochromatic image sensor having a first array of image pixels, wherein the image pixels in the first array of image pixels are diamond-shaped image pixels;
   a polychromatic image sensor comprising:
      a second array of image pixels, wherein the image pixels in the second array of image pixels are diamond-shaped image pixels; and
      a color filter array formed over the second array of image pixels and comprising red and blue color filter elements, wherein the red color filter elements are arranged to form red diagonal stripes of contiguous red color filter elements that extend diagonally from a first edge of the second array to a second edge of the second array, wherein the blue color filter elements are arranged to form blue diagonal stripes of contiguous blue color filter elements that extend diagonally from the first edge of the second array to the second edge of the second array, and wherein the red diagonal stripes alternate with the blue diagonal stripes; and
   processing circuitry configured to combine monochromatic image data from the monochromatic image sensor with polychromatic image data from the polychromatic image sensor to form full-color images, wherein the monochromatic image sensor and the polychromatic image sensor have an associated pixel pitch, wherein the processing circuitry interpolates missing pixel data to form the full-color images, and wherein a maximum interpolation distance is $\sqrt{5}$ times the pixel pitch.

2. The imaging device defined in claim 1 wherein the monochromatic image sensor comprises a clear color filter formed over the first array of image pixels.

3. The imaging device defined in claim 1 wherein the monochromatic image sensor comprises a green color filter formed over the first array of image pixels.

4. An imaging device, comprising:
   a green image sensor having a first array of image pixels and a green color filter formed over the first array of image pixels;
   a red and blue image sensor having a second array of image pixels and a color filter array formed over the second array of image pixels, wherein the color filter array comprises red and blue color filter elements, wherein the green image sensor and the red and blue image sensor are operable in high-dynamic-range mode in which alternating rows of image pixels in each of the first and second arrays are exposed for different lengths of time in a given imaging frame; and
   processing circuitry configured to combine green image data from the green image sensor with red and blue image data from the red and blue image sensor to form full-color images, wherein the green image sensor and the red and blue image sensor have an associated pixel pitch, wherein the processing circuitry interpolates missing pixel data to form the full-color images, and wherein a maximum interpolation distance is $\sqrt{5}$ times the pixel pitch.

5. The imaging device defined in claim 4 wherein the image pixels in the first and second arrays of image pixels are diamond-shaped image pixels.

6. The imaging device defined in claim 5 wherein the red color filter elements and the blue color filter elements are interspersed among each other in a checkerboard pattern.

7. The imaging device defined in claim 5 wherein the red color filter elements and the blue color filter elements are arranged in respective groups of red color filter elements and groups of blue color filter elements, wherein each group of red color filter elements and each group of blue color filter elements forms a zigzag pattern that extends from an upper edge of the second array to a lower edge of the second array, and wherein the groups of red color filter elements are interleaved with the groups of blue color filter elements.

8. The imaging device defined in 5 wherein the red color filter elements are arranged to form red diagonal stripes that extend diagonally from a first edge of the second array to a second edge of the second array, wherein the blue color filter elements are arranged to form blue diagonal stripes that extend diagonally from the first edge of the second array to the second edge of the second array, and wherein the red diagonal stripes alternate with the blue diagonal stripes.

9. A system, comprising:
a central processing unit;
memory;
input-output circuitry; and
an imaging device, wherein the imaging device comprises:
   a monochromatic image sensor having a first array of image pixels, wherein the image pixels in the first array of image pixels are diamond-shaped image pixels;
   a polychromatic image sensor comprising:
      a second array of image pixels, wherein the image pixels in the second array of image pixels are diamond-shaped image pixels; and
      a color filter array formed over the second array of image pixels and comprising red and blue color filter elements, wherein the red color filter elements and the blue color filter elements are arranged in respective groups of red color filter elements and groups of blue color filter elements, wherein each group of red color filter elements and each group of blue color filter elements forms a zigzag pattern that extends from an upper edge of the second array to a lower edge of the second array, wherein each red color filter element within each group of red color filter elements shares a side with at least one other red color filter element, and wherein the groups of red color filter elements are interleaved with the groups of blue color filter elements; and
   processing circuitry configured to combine monochromatic image data from the monochromatic image sensor with polychromatic image data from the polychromatic image sensor to form full-color images, wherein the monochromatic image sensor and the polychromatic image sensor have an associated pixel pitch, wherein the processing circuitry interpolates missing pixel data to form the full-color images, and wherein a maximum interpolation distance is $\sqrt{5}$ times the pixel pitch.

10. The system defined in claim 9 wherein the monochromatic image sensor comprises a green image sensor having a green color filter formed over the first array of image pixels.

11. The imaging device defined in claim 1, wherein each of the blue color filter elements shares a side with at least one other blue color filter element.

12. The imaging device defined in claim 1, wherein each of the red color filter elements shares a side with at least one other red color filter element.

* * * * *